Jan. 17, 1933.  H. W. LANGBEIN  1,894,405
BRAKE TESTER
Filed June 23, 1930

INVENTOR:
Harold W. Langbein,
BY R. S. Burry
ATTORNEY.

Patented Jan. 17, 1933

1,894,405

UNITED STATES PATENT OFFICE

HAROLD W. LANGBEIN, OF LOS ANGELES, CALIFORNIA

BRAKE TESTER

Application filed June 23, 1930. Serial No. 463,194.

This invention relates to a mechanism for testing the brakes of motor vehicles, and has as its primary object the provision of a means whereby the brakes of a vehicle may be tested under varying vehicle load conditions.

Heretofore in the testing of brakes of motor vehicles it has been common practice to effect testing of the brakes without regard to the fact that the brakes may vary in their efficiency under various vehicle loads. I have found in practice in testing the brakes of motor vehicles that while the test may show the brakes as functioning properly with the vehicle empty or under a light load they will not be necessarily efficient when the vehicle is more heavily loaded because under such loaded conditions the vehicle frame will be disposed in closer relation to the vehicle axle than when under a light load and accordingly will effect a change in the relation of the brake gear carried by the vehicle frame and the brake operating mechanism carried by the vehicle axle thereby resulting in a difference in the action of the brake under the load condition.

The present invention contemplates the provision of a vehicle brake testing mechanism embodying means whereby a condition of various loads may be imposed on the vehicle body or frame during the brake testing operation so as to enable determining of the effectiveness of the brake under various load conditions of the vehicle.

With the foregoing objects in view together with such other objects and advantages as may subsequently appear the invention is carried into effect by the provision of a means for imposing various loads upon a vehicle frame adapted to be operated in conjunction with a brake testing mechanism as will be hereinafter more fully described and claimed, and which is illustrated by way of example in the accompanying drawing, in which:

Figure 1:
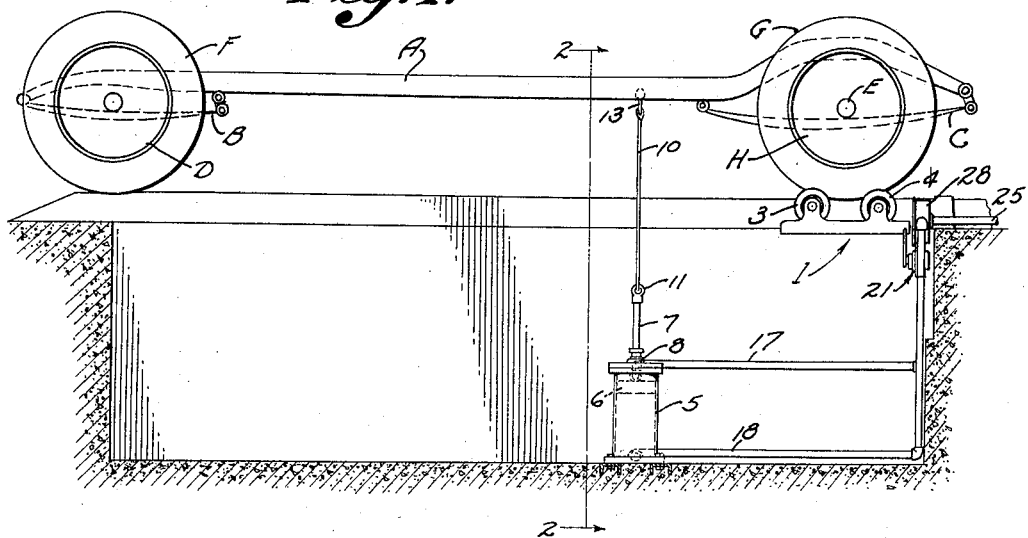
Fig. 1 is a view in side elevation illustrating the application of the invention.
Figure 2:
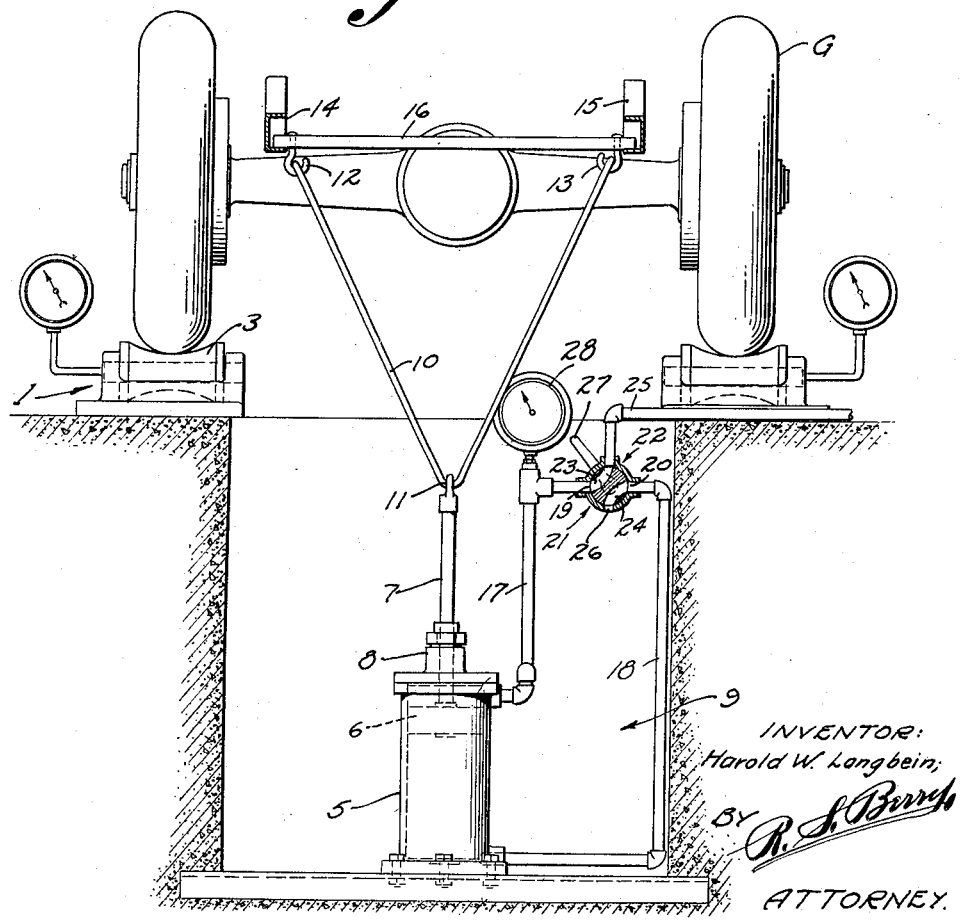
Fig. 2 is a view in section and elevation as seen on the line 2—2 of Fig. 1 in the direction indicated by the arrows.

Referring to the drawing more specifically A indicates a vehicle frame supported by springs B and C on the front and rear axles D and E, respectively, which are fitted with front wheels F and rear wheels G in the usual manner, and which wheels are equipped with conventional brake mechanism indicated generally at H.

A brake testing mechanism is indicated generally at I and is here shown as embodying a pair of rollers 3 and 4 arranged to afford a support for each of the brake carrying wheels of the vehicle. The rollers 3 and 4 are operatively connected to brake testing indicators in the usual manner, whereby on rotation of the vehicle wheels supported thereon and the application of the brakes the effectiveness of the brakes may be determined.

In the application of the invention as here shown manually controlled fluid pressure operated means are provided for imposing various loads on the vehicle frame when the vehicle wheels are supported on the rollers 3 and 4 of the brake tester, whereby the brakes may be tested under various vehicle load conditions.

This means is here shown as embodying a cylinder 5 in which is mounted for vertical reciprocal movement a piston 6 carried on a piston rod 7 projecting through a packing gland 8 on the upper end of the cylinder 5; the cylinder 5 being disposed in a pit above which the vehicle is positioned when the wheels thereof are carried on the rollers 3 and 4 of the brake tester.

Means are provided for effecting connection between the upper end of the piston rod 7 and the vehicle frame A, or to the vehicle body, which may be of any suitable construction but is here shown as comprising a flexible line 10 which may comprise a chain or cable, which line is slidably connected intermediate its ends to a hook or loop 11 formed on the upper end of the piston 7 and the ends of which line are connected to hooks 12 and 13 adapted to be connected to the side members 14 and 15 of the vehicle frame, the hooks being here shown as attached to a bar 16 the ends of which are extended into channels formed in the frame members. It is manifest that the connection between the piston and the vehicle may be made at any convenient point on the vehicle according to the construction of the latter, and therefor the means here shown for this purpose is merely illustrative. The cylinder 5 is positioned so that its axis and that of the piston rod 7 will extend on a vertical plane leading intermediate the side frames of the vehicle so that on downward movement of the piston 6 a substantially equal pull will be imparted on each of the frame members.

Means are provided for effecting reciprocation of the piston 6 here shown as including fluid pressure conveying conduits 17 and 18 leading from the upper and lower portions of the cylinder 5 and opening thereto on opposite sides of the piston 6; the conduits 17 and 18 leading to ports 19 and 20 in the casing of a control valve 21 which valve is here shown as embodying a turnable valve 22 formed with passages 23 and 24 arranged to effect communication between either of the conduits 17 and 18 and a source of fluid pressure supply through a conduit 25 or to effect communication between the conduits 17 and 18 and an exhaust port 26 according to the position of the valve 22. The valve is fitted with a hand lever 27 whereby it may be disposed in the desired position to effect delivery of fluid pressure to either side of the piston 6. The conduit 17 is fitted with a pressure gauge 28 for indicating the pressure delivered to the upper side of the piston 6 under which the latter is forced downwardly.

In the operation of the invention a vehicle is positioned with the brake carrying wheels thereof on the rollers 3 and 4 of the brake tester 1 in the usual manner whereupon connection is effected between the vehicle frame and the piston rod 7 with the piston disposed in its uppermost position; the piston being elevated by effecting communication between the conduit 18 and the pressure supply conduit 25 through the passage 24 of the valve 22. The wheels of the vehicle are then set in operation in the usual manner to effect actuation of a suitable indicator through one of the rollers 3 or 4 as is common in brake testing operations. When it is desired to effect testing of the brakes under various vehicle load conditions the valve 22 is disposed to direct fluid pressure above the piston 6 thereby forcing the latter downwardly and imparting a downward pull on the vehicle frame. Any desired load may be thus imposed on the vehicle frame within limits and the extent of such load may be determined by reading of the indicator 28.

It will now be seen that the brakes of the vehicle may be tested under various vehicle loads.

After effecting the desired operations, the valve 22 is turned to open the upper end of the cylinder 5 to exhaust and to direct fluid pressure beneath the piston 6, thereby effecting restoration of the piston to its uppermost position whereupon the connection between the piston rod and the vehicle frame may be detached.

It is to be understood that the manner of carrying the invention into effect is herein specifically set forth to enable those skilled in the art to make and use the same and is to be considered as illustrative and not in a limiting sense; and that various changes may be made in the parts and in their construction and arrangement within the meaning of the terms and scope of the appended claims without departing from the spirit of the invention.

For example, while the invention is shown as applied to the testing of brakes on the rear wheels of the vehicle, it manifestly may be employed in testing brakes on the front wheels thereof, which is effected in like manner, either coincident with the testing of the brakes on the rear wheels or independently thereof. Furthermore while the invention is here shown as applied to a brake tester embodying rollers on which the vehicle wheels are supported, it obviously may be employed with brake testers having other means of vehicle wheel support.

I claim:

1. In a vehicle-brake testing mechanism, the combination with the vehicle wheel supports of a brake tester, of means for imposing various loads on the frame of a vehicle while the wheels thereof are carried on said supports and means for measuring the extent of such imposed loads.

2. In a mechanism for testing the brakes of a motor vehicle the combination with the rollers of a brake tester on which the wheels of a vehicle are adapted to be supported, of manually controlled means for imposing various loads on the frame of a vehicle while the wheels thereof are supported on said rollers and means for measuring the extent of such imposed loads.

3. In a mechanism for testing the brakes of a motor vehicle the combination with the rollers of a brake tester on which the wheels of a vehicle are adapted to be supported, means engageable with the frame of a vehicle for imposing various loads thereon while testing the brakes thereof and means for measuring the extent of such imposed loads.

4. In a mechanism for testing the brakes of a motor vehicle, the combination with the wheel supporting rollers of a vehicle-brake tester, of manually controlled fluid pressure actuated means for creating various vehicle load conditions on the vehicle while wheels thereof are supported on the rollers.

5. In the mechanism for testing the brakes of a motor vehicle the combination with the wheel supporting rollers of a vehicle-brake tester, a cylinder, a piston reciprocably mounted in said cylinder, means for effecting connection between said piston and a motor vehicle, means for directing fluid under pressure in the said cylinder for actuating said piston to thereby impose a load on the vehicle while wheels thereof are supported on the rollers, and means for indicating the extent of such load.

6. In a mechanism for testing the brakes of a motor vehicle, a brake tester including wheel supporting rollers arranged to carry the wheels of a vehicle in effecting testing of the vehicle brakes, a cylinder, a reciprocal piston in said cylinder, manually controlled means for effecting reciprocation of said piston under fluid pressure, and means affording connection between said piston and a vehicle arranged to exert a downward pull on the vehicle relatively to the vehicle wheel supports of the brake tester.

7. In a vehicle-brake testing mechanism, the combination with a brake tester, of means for imposing various loads on the vehicle, and means for measuring the extent of such imposed loads.

8. In a mechanism for testing the brakes of a motor vehicle, the combination with wheel supporting members of a vehicle brake tester, a manually controlled fluid pressure actuated means for creating various vehicle load conditions on the vehicle while wheels thereof are supported on the rollers, and means for measuring the extent of such loads.

HAROLD W. LANGBEIN.